May 17, 1938.  R. E. HARMON  2,117,717

BOLT

Filed Jan. 6, 1937

INVENTOR
ROBERT E. HARMON
BY Paul, Paul & Moore
ATTORNEYS

Patented May 17, 1938

2,117,717

UNITED STATES PATENT OFFICE 2,117,717

BOLT

Robert E. Harmon, Chicago, Ill.

Application January 6, 1937, Serial No. 119,298

8 Claims. (Cl. 85—9)

This invention relates to new and useful improvements in bolts, and more particularly to so-called hook bolts adapted for such uses as securing railroad ties or other wooden beams to steel girders or rails.

An object of the invention is to provide a hook bolt comprising a body having oppositely disposed fins made integral with said body and disposed in a plane substantially tangent to the periphery of the bolt body, and disposed at right angles to the medial plane of the bolt head, whereby said fins are symmetrically disposed about the bolt body, thereby to resist turning movement thereof in both directions.

A further object is to provide a bolt of the character described, comprising a body having a head at one end offset from the axis of the bolt body and provided with a face disposed at substantially right angles to said axis, and oppositely disposed fins being provided on the bolt body, which fins lie in a plane disposed at right angles to the medial plane of the head and substantially intersecting the periphery of the bolt body beneath said head, whereby an extended flattened surface is provided between the outer sharpened edges of said fins adapted to engage the work, thereby to resist turning movement of the bolts in both directions.

Other objects of the invention reside in the simple and unique construction of the bolt, whereby it may be manufactured in quantity production at small cost; in the arrangement of the oppositely disposed pairs of fins provided on the bolt body, which cooperate to provide flattened surfaces disposed in parallel relation, and which function to resist turning movement of the bolt in both directions; in the provision of a hook bolt comprising a plurality of fins projecting beyond the body, and of which two, at least, are disposed in a plane which substantially intersects the periphery of the bolt body beneath the bolt head, thereby to provide an extended flattened surface operating to resist turning movement of the bolt body in both directions; and in the provision of a hook bolt which is extremely simple in construction and is provided with means for positively preventing it from relatively rotating when a tortional force is imparted thereto, when in use, or securing it in position in the work.

Other objects of the invention will appear from the following description and accompanying drawing and will be pointed out in the annexed claims.

In the accompanying drawing there has been disclosed a structure designed to carry out the various objects of the invention, but it is to be understood that the invention is not confined to the exact features shown as various changes may be made within the scope of the claims which follow.

Figure 1:
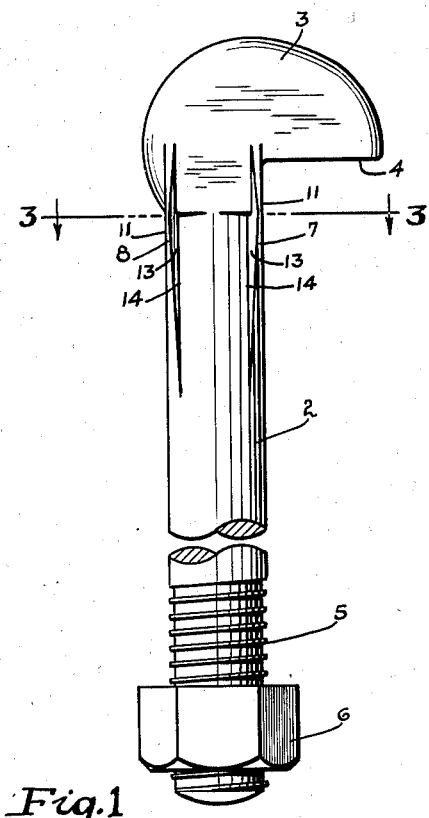
Figure 1 is a side view of the improved bolt showing the preferred arrangement of the fins.

The novel hook bolt herein disclosed is shown comprising a cylindrical body 2, having a hook-shaped head 3 at one end provided with a flat face 4 disposed at substantially right angles to the axis of the bolt body. The opposite end of the bolt is threaded at 5, as shown in Figure 1, to receive a suitable nut 6.

Figure 2:
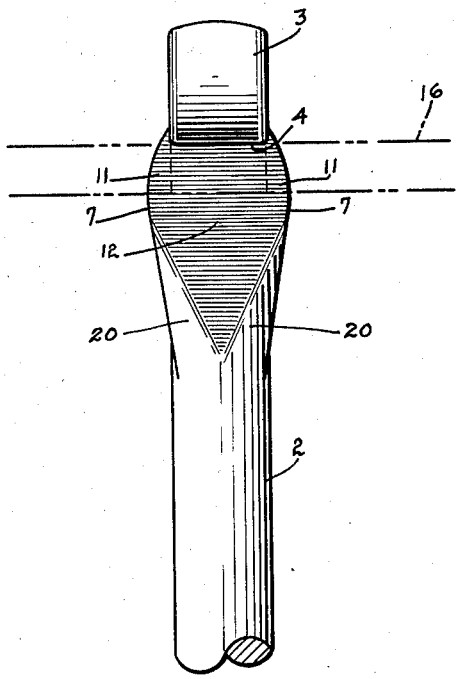
Figure 2 is a front view of the bolt, showing the extended flattened surface provided beneath the bolt head.
Figure 5:
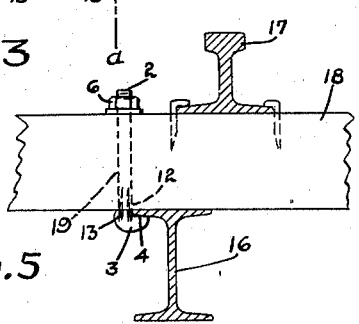
Figure 5 is a view on a smaller scale diagrammatically illustrating one use of the bolt.

An important feature of the present invention resides in the novel means provided on the bolt body for preventing relative rotation thereof in both directions, when in use, or when securing it in the work, or removing it therefrom. The means provided for thus preventing the bolt from relatively rotating in the work, is shown comprising a plurality of fins 7—7 and 8—8, preferably made integral with the bolt body 2, as clearly illustrated in Figure 3. The fins 7—7 have their outer edges lying in a plane a—a disposed at right angles to the medial plane of the head 3 and substantially intersecting the periphery of the bolt body, as indicated at 9 in Figure 3. The outer faces 11 of the fins 7—7 cooperate to provide an extended flat surface, generally indicated by the numeral 12, in Figure 2 which, when the bolt body is inserted in a timber, as shown in Figure 5, will positively prevent the bolt body from rotating in both directions, as will readily be understood by reference to Figure 3. The fins 8—8 are preferably arranged in substantially the same manner as the fins 7—7, and thus cooperate with the latter to prevent relative rotation of the bolt body.

An important feature of the invention resides in the fact that the fins are made relatively thin at their outer edges to provide, in effect, knife edges which tend to sever the wood fibers, when the bolt is driven into the tie or timber. It is to be understood that when the bolt is to be secured in a timber, a hole is first bored through the timber for receiving the bolt, the diameter of which is substantially the same as the diameter of the bolt body. Thus, when the bolt is driven into the hole provided in the tie, the flat faces 11 and inner faces 13 of the fins will tightly engage the wood and thus prevent relative rotation of the bolt body in the tie. The particular arrangement of the fins also prevents the formation of voids at the bottoms 14 of the fins, which might tend to lessen the effective resistance to turning of the bolt body.

Figures 3, 4:
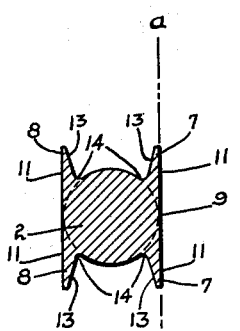
Figure 3 is a detail sectional view on the line 3—3 of Figure 1, showing the arrangement of the oppositely disposed fins on the bolt body.
Figure 4 is a view showing a construction in which three fins are used.

In Figure 4, there is shown a modified construction in which the bolt body 2 is provided at one side with oppositely disposed fins 7—7, similar to those shown in Figure 3, but in lieu of the fins 8—8, a single fin 15 is provided on the bolt body and is radially disposed with respect thereto so that it will be disposed in substantially right angular relation to the plane of the fins 7—7. The form shown in Figure 4, like that shown in Figure 3, will resist turning movement of the bolt body in both directions, as will readily be understood.

The novel hook bolt herein disclosed, while it may have many applications of use, is particularly well suited for securing ties 18 to the steel beams 16 of a railroad structure, as illustrated in Figure 5. When thus used, the hook-shaped heads 3 engage the flanges of the supporting beams 16, and thus positively secure the ties to said beam. When securing the ties 18 to the beams 16, the holes in the ties for receiving the hook bolts, are so arranged with respect to the beams 16, that the flat faces 12 of the hook bolts will be seated against the flanges of the beams 16, as clearly illustrated in Fig. 5. Thus, the edges of the beams will cooperate with the fins to positively prevent the bodies of the bolts from relatively turning in the ties, when mounted therein, as shown in Figure 5.

As hereinbefore stated, the unique design of the bolt is such that it may readily be manufactured in quantity production at very small cost which, obviously, is highly desirable in devices of this general character.

In the foregoing, the outer faces 11 of the alined fins at each side of the bolt body have been described as lying in planes substantially tangent to the periphery of the bolt body, whereby the faces 11 of each pair of fins cooperate to provide the extended flat surfaces 12 disposed on diametrically opposite sides of the bolt body. This is true of the fins at their point of maximum width, as clearly illustrated in Figures 2 and 3. The end portions 20 of the fins may, however, diverge somewhat from the plane of the flat faces 12, to simplify manufacturing operations, without departing from the scope of the invention.

I claim as my invention:

1. A bolt of the class described, comprising a body having a head at one end and provided at its opposite end with means for securing it in position in the work, and oppositely disposed web-like fins made integral with said body and having outer cutting edges lying in a plane substantially tangent to the periphery of the bolt body.

2. A bolt of the class described, comprising a body having a head at one end and provided at its opposite end with suitable threads adapted to receive a nut for securing the bolt in the work, and oppositely disposed web-like fins made integral with said body and having outer cutting edges lying in a plane substantially tangent to the periphery of the bolt body.

3. A bolt of the class described, comprising a body having a head at one end offset from the axis of the bolt and having its opposite end threaded to receive a nut, and oppositely disposed web-like fins having outer cutting edges, said fins being constructed as an integral part of the bolt body and disposed at right angles to the medial plane thereof.

4. A bolt of the class described, comprising a body having a head at one end offset from the axis of the bolt and having a face disposed at substantially right angles to said axis, oppositely disposed fins on the bolt body having outer knife edges lying in a plane disposed at substantially right angles to the medial plane of the head and intersecting a radius of the bolt body at substantially the periphery of the bolt body.

5. A bolt of the class described, comprising a body having a head at one end and threaded at its opposite end to receive a nut, and oppositely disposed pairs of web-like fins made integral with the bolt body and having outer cutting edges lying in parallel planes tangent to the circumference of the bolt body.

6. A bolt of the class described, comprising a body having a hook-shaped head at one end and threaded at its opposite end to receive a nut, and oppositely disposed pairs of web-like fins on the bolt body having relatively sharp outer edges, the outer edges of the fins of each pair of fins lying in a plane which is substantially tangent to the periphery of the bolt body, said planes being disposed in substantially parallel relation.

7. A bolt of the class described, comprising a body having a hook-shaped head at one end and having its opposite end threaded to receive a nut, oppositely disposed fins on the bolt body having outer sharpened edges lying in a plane disposed at substantially right angles to the medial plane of the head and intersecting a radius at substantially the periphery of the bolt body, whereby said fins are symmetrically disposed so as to resist turning movement of the bolt body in both directions.

8. A bolt of the class described, comprising a body having a hook-shaped head at one end provided with a face disposed at substantially right angles to the axis of the bolt body, oppositely disposed web-like fins made integral with the bolt body and having outer faces lying in a plane disposed at substantially a tangent to the periphery of the bolt body, said faces having outer cutting edges, whereby said fins are symmetrically disposed with respect to said head, and whereby oppositely disposed flat faces are provided on the bolt body adapted to resist relative turning movement of the bolt in both directions.

ROBERT E. HARMON.